United States Patent [19]

Husseiny et al.

[11] Patent Number: 4,985,824
[45] Date of Patent: Jan. 15, 1991

[54] RELIABLE FUZZY FAULT TOLERANT CONTROLLER

[76] Inventors: Abdo A. Husseiny, P.O. Box 1282; Enju Liang, 1800 Glendale Dr., #2, both of LaPlace, La. 70068; Rodrigo Rodriguez, 733 Wright Ave., Gretna, La. 70056

[21] Appl. No.: 114,988

[22] Filed: Oct. 30, 1987

[51] Int. Cl.$^5$ .................. G06F 15/46; G06G 7/00
[52] U.S. Cl. ................................ 364/187; 364/807
[58] Field of Search ............... 371/8, 7; 364/131, 132, 364/135, 136, 187, 513, 600, 807, 601; 187/124, 127, 107

[56] References Cited

U.S. PATENT DOCUMENTS

| 4,347,563 | 8/1982 | Paredes | 371/9 |
| 4,694,418 | 9/1987 | Ueno | 364/807 |
| 4,716,540 | 12/1987 | Yamakawa | 364/807 |
| 4,760,896 | 8/1988 | Yamaguchi | 187/27 |

FOREIGN PATENT DOCUMENTS

0213940 11/1987 United Kingdom .

OTHER PUBLICATIONS

Taunton, J. C., A Rule Based Supervisory Control System, IEEE, Nov. 29, 1985.

Kane, L. A., AI and MAP in the Processing Industries, Hydrocarbon Processing, Jun. 1986.

Saito, Morio, et al., An Automatic Diagnosing System for the Blast Furnace Operating Conditions IECON '84, Oct. 1984.

*Primary Examiner*—Michael R. Fleming
*Attorney, Agent, or Firm*—Sixbey, Friedman, Leedom & Ferguson

[57] ABSTRACT

The invention is a controller which provides continuous regulation of the output of a process or a plant as well as performing discrete control functions. The REFFTAC includes an adaptive direct digital controller (ADDC) as a primary expert controller and a fuzzy expert controller (FEcD) as a backup controller. In case of an error or failure of the primary ADDC the control function is transferred via an interface system (INF) to the FEC, thus preventing any fault in the REFFTAC mission. The INF system is a simple fuzzy controller which includes means to verify the control action and a timer to assure proper control action. It also includes a simulator that performs a self diagnosis on both the ADDC and the FEC to assure fault tolerance. Also, the REFFTAC comprises learning expert units which stores correct control actions for direct application to save time and to provide a reference for the INF system.

9 Claims, 20 Drawing Sheets

RELIABLE FUZZY FAULT TOLERANT CONTROLLER

BACKGROUND OF THE INVENTION

1. Field of the Invention

The invention relates generally to a hybrid control system for regulation of the output of a process or a plant, and to perform discrete control functions.

2. Background of the Invention

U.S. Pat. No. 3,697,957 relates to a self-organizing control system. The control system combines statistical decision theory, prediction theory, and rapid trial generation to determine future control actions. The system includes on-line sampling and changing of the system operation. Performance assessment units are included, and a "probability state" variable unit is included for the control operation. The probability state variable unit may be broadly construed as a "fuzzy" logic controller in this context.

U.S. Pat. No. 4,587,470 relates to a multiplex control system having a backup controller. In case of an abnormal condition, control is switched from the main controller to a secondary controller. An interfacing means is provided for providing a time lag to prevent tracking of control data. The control system addresses difficulties in tracking computational data for a system including main and subsidiary controllers of different hardware structures, such as analog and digital devices in combination. Thus, this reference addresses the problem of providing two differing control structures to assure reliability.

U.S. Pat. No. 4,628,462 relates to a power plant which includes a detailed model as well as a multiplane control system. Optimization results are calculated off-line recurrently. Several models are included in the system, and the system includes overrides.

U.S. Pat. No. 4,639,853 relates to an adaptive switching on-off controller. A model is used, and a manufacturing system is shown.

U.S. Pat. No. 4,661,911 relates to an adaptive constant refiner having an intensity control. This reference teaches adaptive control with a control algarhythm.

None of the references cited teaches the combination of a primary controller which is an adaptive direct digital controller as a primary expert controller, together with a backup controller which is a "fuzzy" expert controller, with the control function being transferred by an interface system which includes a simulator that performs a soft diagnosis, with learning expert units storing correct control action for direct application and to provide a reference for the interface system.

SUMMARY OF THE INVENTION

It is an object of the present invention to provide a hybrid control system including a primary controller of a first type, and a backup controller of a second type.

It is another object of the present invention to provide a hybrid control system including two controllers and an interface, the first controller being an adaptive direct digital controller functioning as an expert controller, and a "fuzzy logic" expert controller as a second controller.

It is still another object of the present invention to provide a hybrid control system including a primary controller, a backup controller, and an interface system including a simulator.

It is a still further object of the present invention to provide an interface system for a primary and a backup controller, the interface system including a simulator, with the interface system determining when the backup controller is to take over for the primary controller, in order to assure fault tolerance.

It is a still further object of the present invention to provide a hybrid control system including learning expert units which store correct control actions for direct application, to provide a reference for an interface system between two controllers, the controllers being of different types.

The REFFTAC invention is a reliable, fuzzy fault tolerant controller. The controller provides continuous regulation of the output of a process for a plant, and includes an adaptive direct digital controller as a primary expert controller, and a fuzzy expert controller as a backup controller. In case of error or failure of the primary controller, the control function is transferred via an interface system to the backup controller. The interface system includes a simulator that performs a self diagnosis on both the primary controller and the secondary controller to assure fault tolerance. The REFFTAC includes learning expert units which store correct control actions for direct application, to save time and to provide a reference for the interface system.

The REFFTAC design is based on achieving fault tolerance by redundancy and diversification. Redundancy is implemented in having two controllers operating on line to design control actions. One of the controllers has the primary role in providing the desired control strategy. Diversification is accomplished by selection of two controllers based entirely on different control principles. The first employs a cautious, self-optimizing, adaptive digital control scheme and the second utilizes a fuzzy control scheme. In the latter, the output of the process/plant is evaluated in terms of verbal rating of deviation from a set point (DSP); such as large deviation above set point, deviation above set point, small deviation above set point, insignificant deviation above set point, insignificant deviation below set point, small deviation below set point, deviation below set point, and large deviation below set point. For each subset, there exists a range of deviation. However, at a specific value of such a range the degree of belonging or membership function is the highest (=1). Other values have a lower degree of membership that drop to zero at some values.

The output signal of the process/plant is also evaluated in terms of rate of deviation from the set point. Thus, the rate can be described as rapidly receding from set point, receding from set point, slowly receding from set point, infinitesimal deviation from set point, slowly approaching set point, approaching set point, and rapidly approaching set point.

The verbal description is what the operator of the process/plant will use to describe the change. Also the operator will take control actions identified as large increase in the input, increase in the input, small increase in the input, maintain the input as it is, small reduction in the input, reduction in the input, and large reduction in the input.

By translating the operation rules whether from a written procedure or by interrogating experienced operators, control rules can be developed for each possible combination of DSP and change in DSP using the possible set of control actions.

By transforming the signal from the process/plant into fuzzy descriptive ranges, the rules can be searched to select the most applicable or optimal control action using a fuzzy control algorithm.

The two controllers are connected via an interface which checks the validity of the primary controller action and the execution time for the control command according to an acceptance criteria. In case of failure or wrong action the control function is delegated to the fuzzy controller. The interface between the controllers includes an acceptance test utilizing a simple fuzzy control scheme.

Both controllers have a learning expert system which is capable of producing control actions based on experience. Also a self diagnostic simulation module is provided to verify, test, and validate the control actions.

Implementation of the REFFTAC on a fault tolerant processor would eliminate any fault in the system.

Here, the phrase "fuzzy set" is defined as multivalued logic. Compared to ordinary sets which are assigned a value of one or zero, fuzzy sets describe a range of values each of which has a different degree of membership in the set.

DETAILED DESCRIPTION OF THE INVENTION

Figure 1:
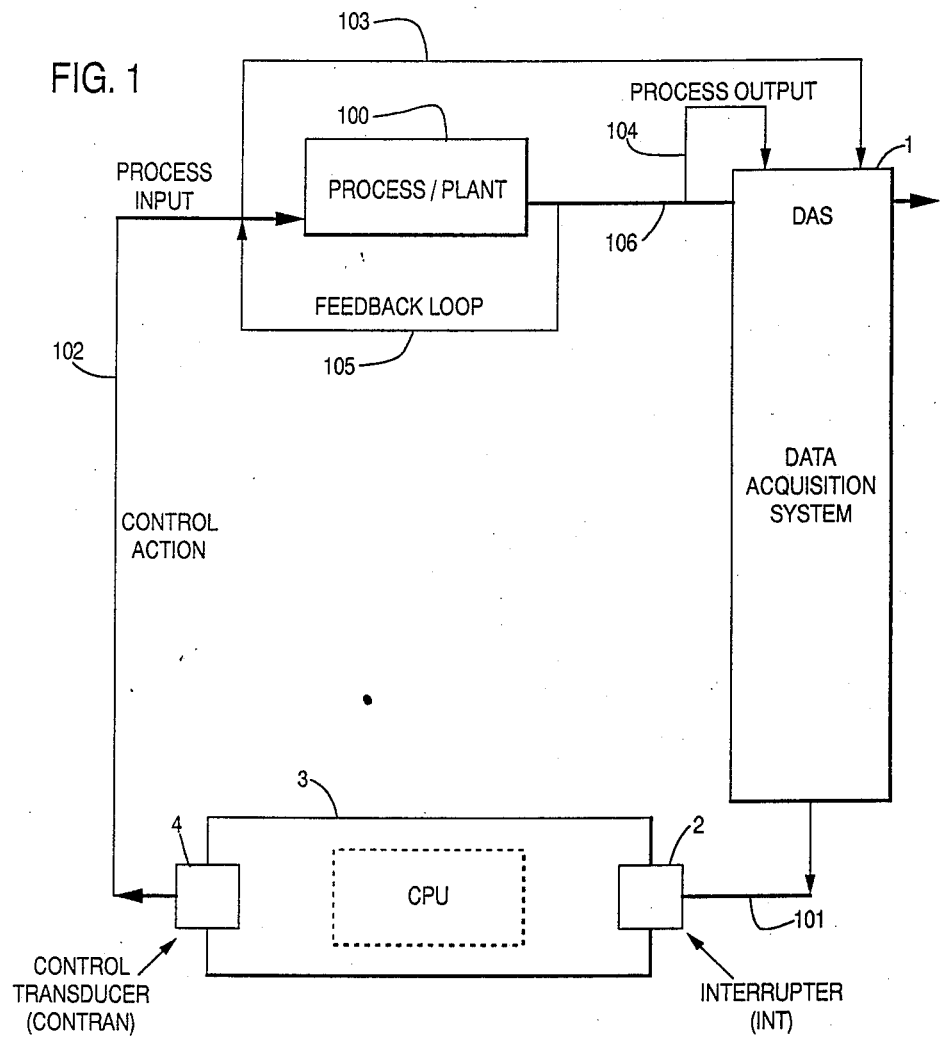
FIG. 1 shows components of the control system hardware.

FIG. 1 shows the basic components of the REFFTAC system. Signals from the process/plant output and input are fed to a data acquisition system, DAS 1, which are directed to a central processing unit, CPU 3 such as the FAULT TOLERANT PROCESSOR (FTP) designed by Draper Laboratories, Cambridge, an NCR Minitower, of a microcomputer. The interrupter INT 2, provides the interface between DAS 1 and the computer (CPU) 3 where the control actions are designed. The resulting control actions are transformed into commands in the control transducer CONTRAN 4, which effects the necessary changes in the input to the process/plant 100.

Figure 2:
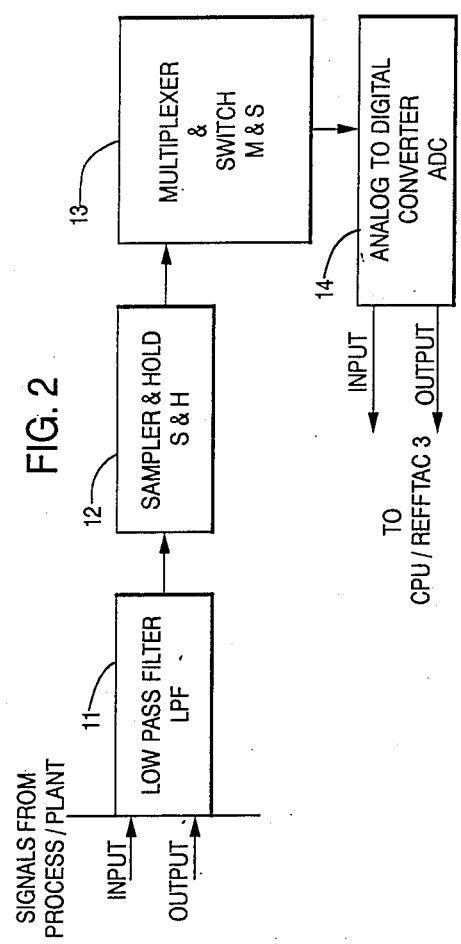
FIG. 2 shows components of the data acquisition system.

FIG. 2 shows the components of DAS 1. Signals from the process/plant 100 flow to a low pass filter LPF 11 to allow the passage of signals within a range of frequency and rejects the rest to eliminate the response to noise in the signals. The cutoff frequency is selected such that the rate of data sampling in the sampler and hold S&H 12, is more than twice the highest frequency inherent in the analog input voltage to the analog to digital converter ADC 14. This is to avoid assailing problems and control difficulties.

Figure 3:
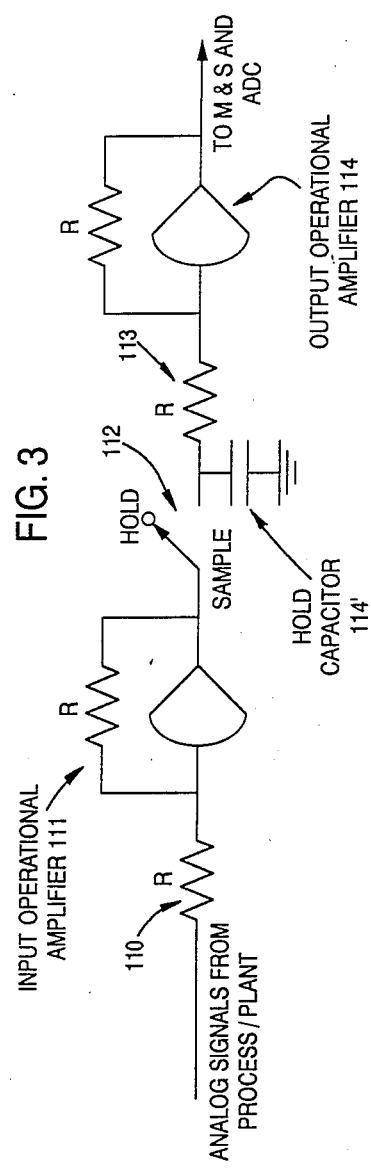
FIG. 3 shows components of the sample and hold system.

The purpose of the S&H 12 is to hold the input signal constant during the analog to digital conversion by the ADC 14. This ensures that the converted value accurately represents the value of the input signal at the time the conversion begins; regardless of the ADC conversion time. The S&H 12 components are shown in FIG. 3. S&H 11 comprises a high input impedance amplifier 111 which is also used to filter the input signal, a high output impedance amplifier 114 for the hold capacitor 114'.

Figure 4:
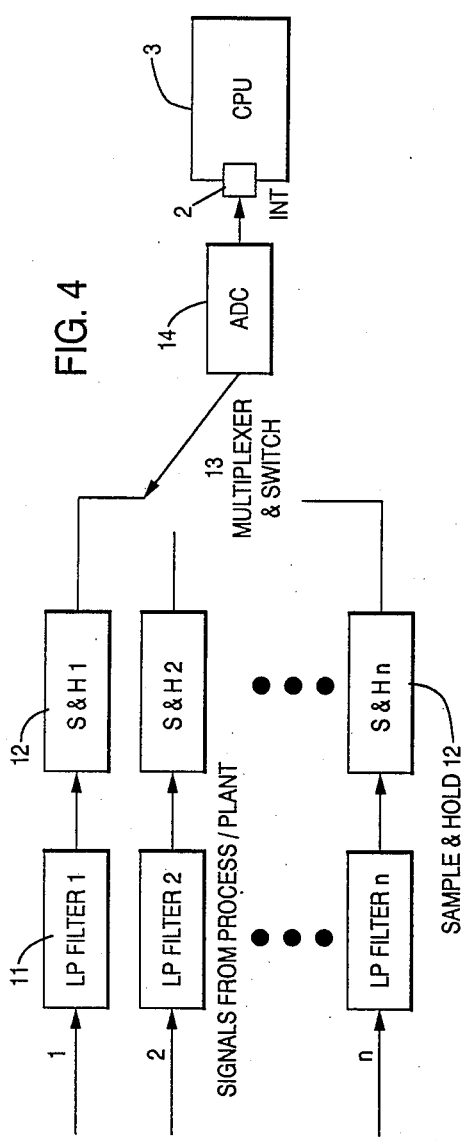
FIG. 4 shows components of the multiplexer and switch.

The third component of DAS 1 is the multiplexer and switch M&S 13, see FIG. 4. The M&S 13 is provided to allow accurate sequential sampling using a single ADC.

Figure 5:
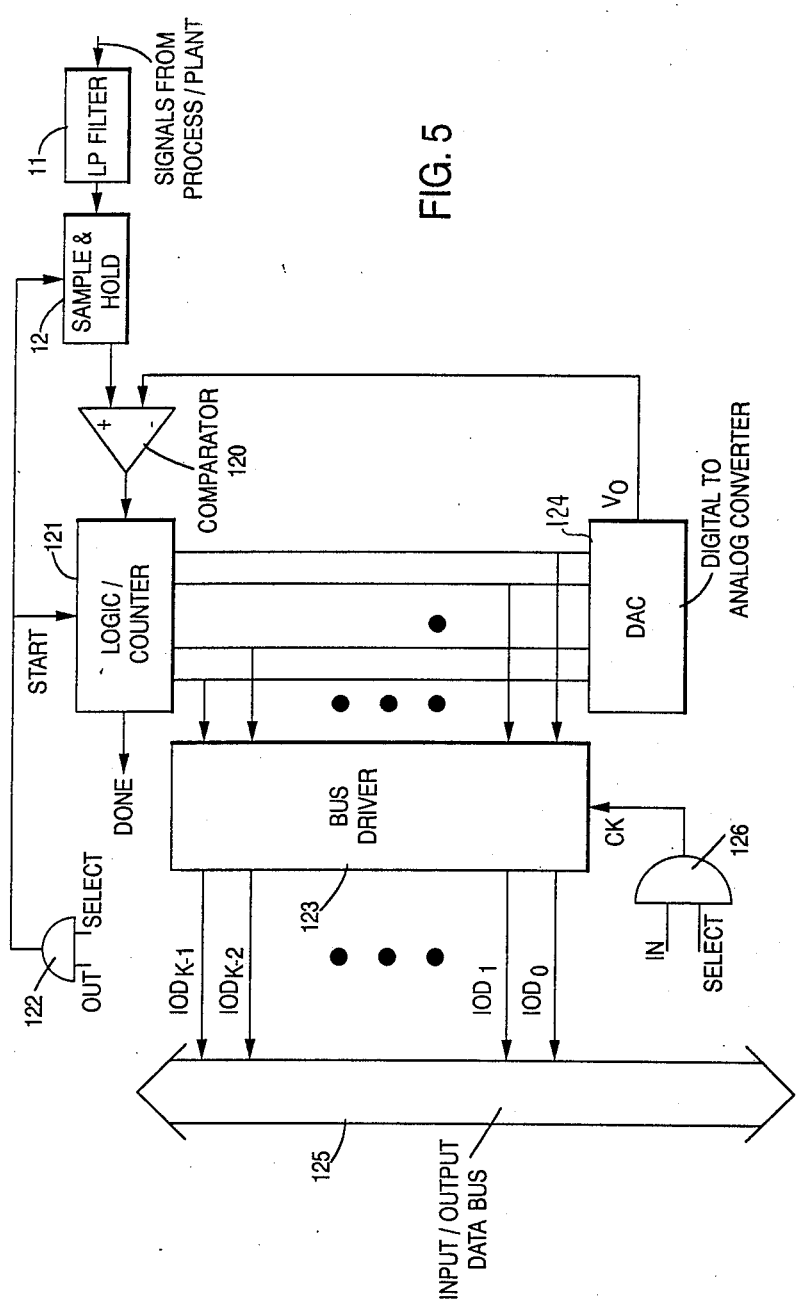
FIG. 5 shows components of the analog to digital converter.

The ADC 14 samples the analog signal and encodes it as binary number, see FIG. 5.

Figure 6:
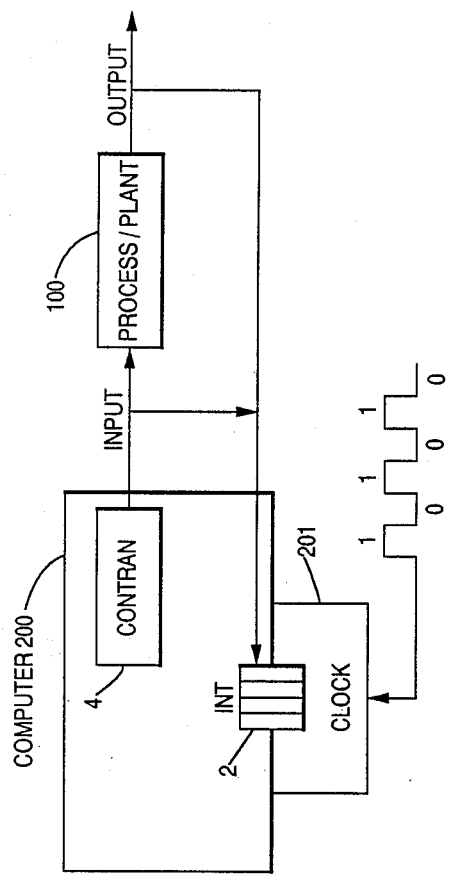
FIG. 6 shows components of the interrupter.

The signal from the ADC 114 is directed to the CPU 3 through the interrupter INT 2 which is available on most computers. INT 2 allows utilization of the computer time that might be spent awaiting a signal from low speed devices. It interrupts computer operation when it is ready to receive or send data. FIG. 6 shows the interrupter function.

Figure 7:
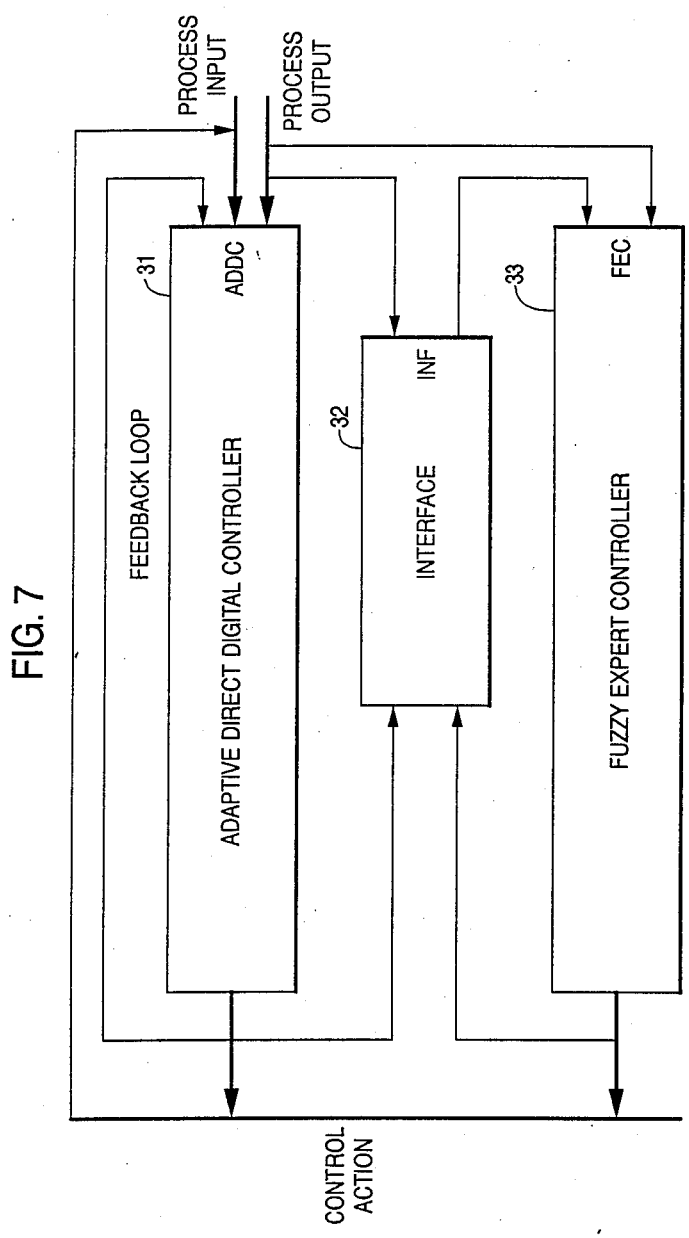
FIG. 7 shows components of the system software.

The signals sequentially receive by the CPU are the filtered digitized input and output signals of the process/plant. The signals are used by the REFFTAC 3 to design a control action to regulate or control the process/plant. REFFTAC 3 comprises ADDC 31, FEC 32, and INF 33 modules as seen in FIG. 7.

Figure 8:
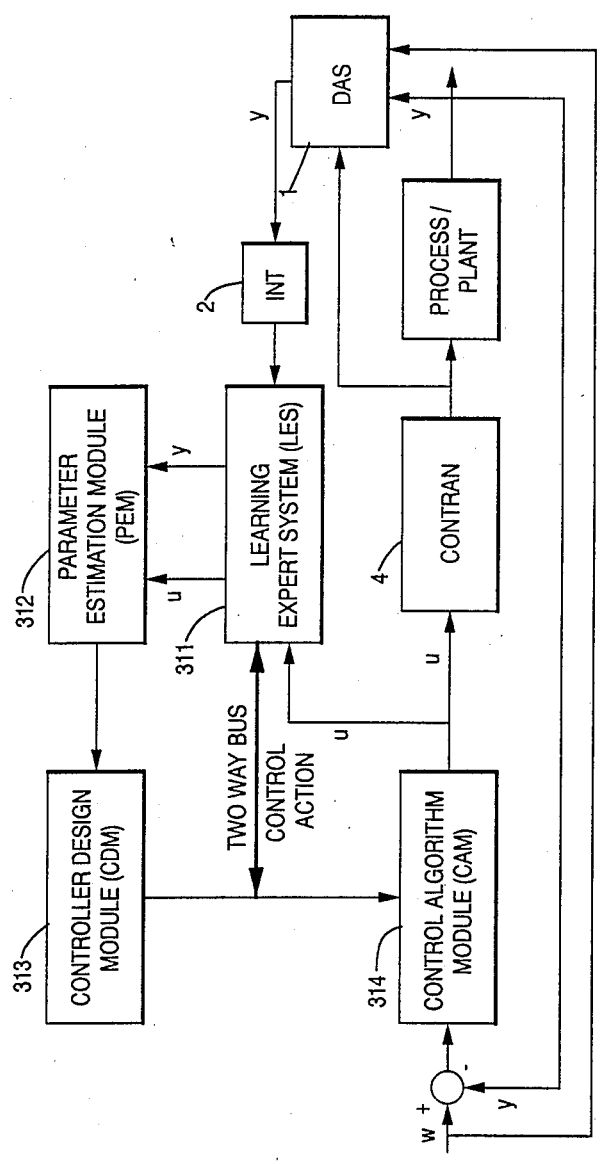
FIG. 8 shows modules of ADDC 31.

The ADDC 31 seen in FIG. 8 comprises a learning expert system; LES 311, parameter estimation module PEM 312, a controller design module CDM 313, and a control algorithm module CAM 314.

The LES 311 is a data management system that receives, compiles, stores, records and retrieves all control actions as well as the corresponding input and output signals of the process/plant 100.

Tested control strategies are also stored on the LES 311 previous to operation of the ADDC 31. Such strategies may be obtained via simulation of the process/plant.

Figure 9:
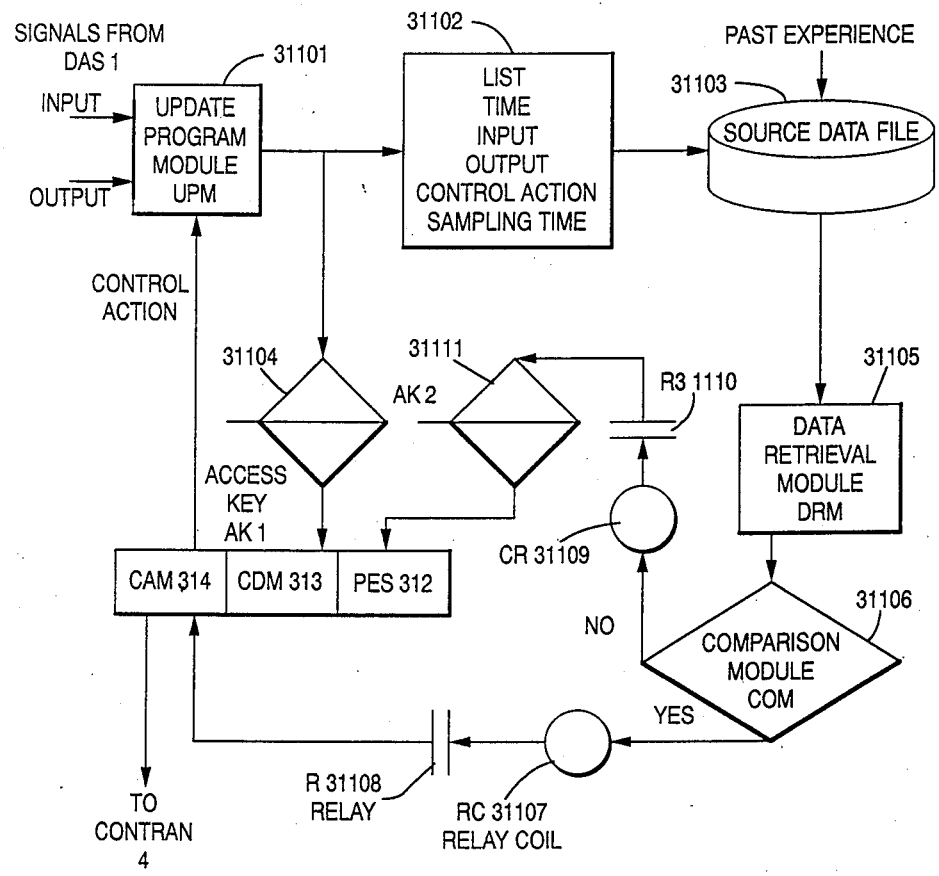
FIG. 9 shows modules of a learning expert system.

FIG. 9 shows the elements of the LES 311. Signals from DAS 1 representing process/plant input and output are received by an updating program module UPM 31101 which provides data as digitized at specific sampling interval and at a particular instant to a listing routine LR 31102. The LR 31102 provides patches of information related to each pair of signals including the corresponding control action. The data from the LR 31102 is recorded in a source data file SDF 31103. Data from UPM 31101 is also accessed by the PES 312 through access key AK 31104 for parameter estimation.

A data retrieval module DRM 31105 acquires data from the SDF 31103. The data including new signals and stored historic control actions are compared in the comparison module COM 31106, to search for a prior control action appropriate for the new input and output signals. If a control action is identified, a relay coil RC 31107 is energized actuating a relay R 31108 and the LES 311 directly provides the control design to the CAM 314. Otherwise the relay coil CR 31109 is energized and the relay R 31110 is actuated to direct the signals to the PEM 312 through an access key AK 31110.

Figure 10:
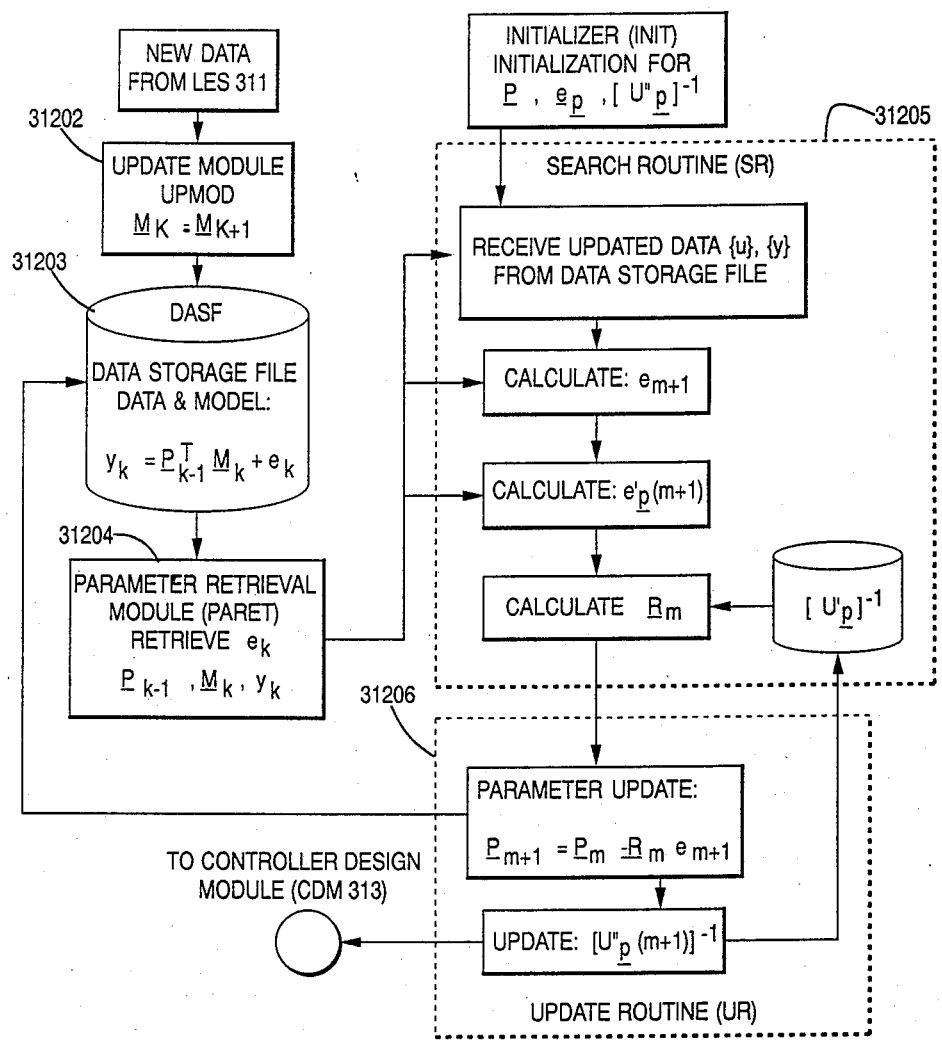
FIG. 10 shows a parameter estimation module.

The PEM 312 fits empirical models to the signals sequentially received by the CPU as the filtered digitized input and output signals of the process/plant, see FIG. 10. This module includes an initializer, INIT 31201 to initialize the objective function. Initial values are input to INIT 31201 at the start of the ADDC operation. However, should experience suggests incorrect initial values a new input is administered.

The data received from LES 311 which represent new signals are fed to an updating module UPMOD 31202 and then entered to a data storage file DASF 31203. The new data is then retrieved by the parameter retrieval module, PARET 31204. Both INIT 31201 and PARET 31204 provide input to the search routine; SR 31205. After calculating the model parameters, the values are directed to the updating routine UR 31206.

Figure 11:
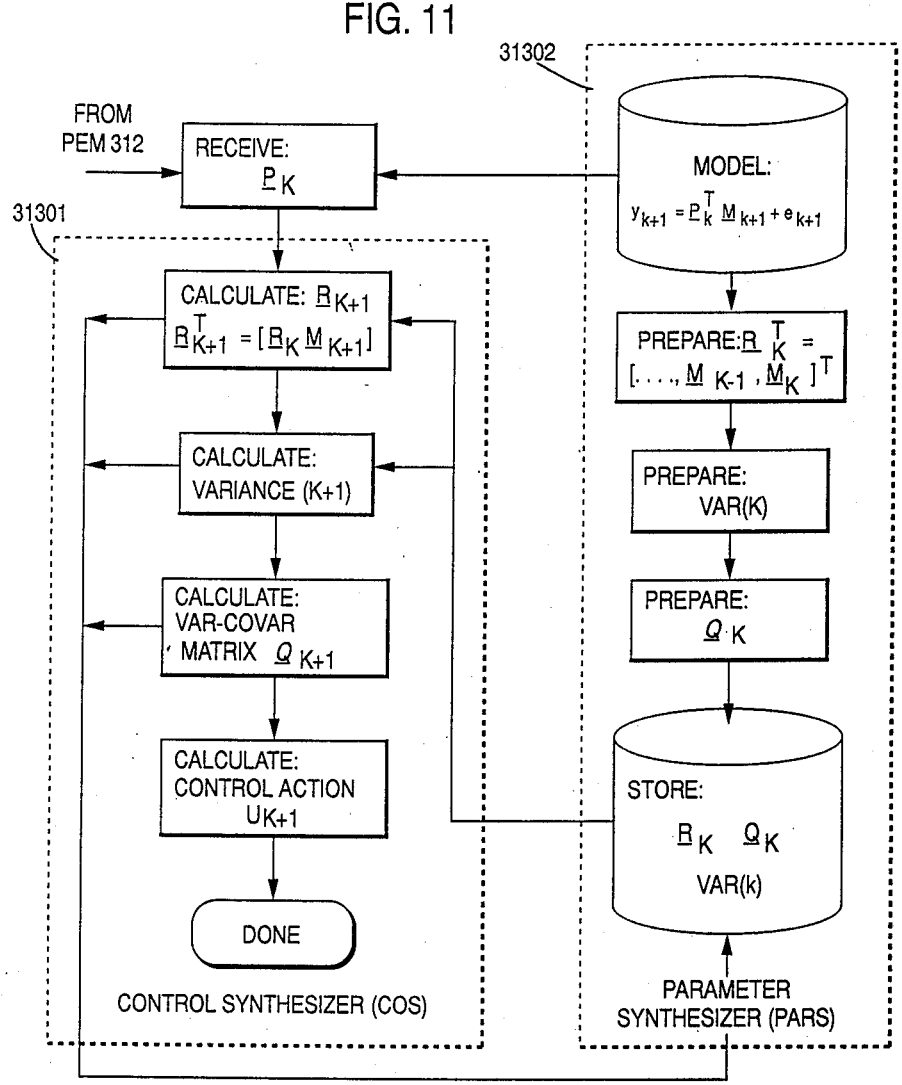
FIG. 11 shows a control design module.

The models obtained by PEM 312 are used in a controller design module, CDM 313, to design on-line a controller which depends on the model fitting the signals, as seen in FIG. 11. In the controller design process, the calculated parameters are received from UR 31206 and control synthesis is performed by the synthesizer, COS 31301. The output is recycled to a parameter synthesizer, PARS 31302 which prepares new model parameters to be input in COS 31301.

The designed control is processed via a control algorithm module, CAM 314 which is in essence a classical controller. The control action is then directed to the process/plant 100 through a control transducer, CONTRAN 4 and also to the LES 311.

Figure 12:
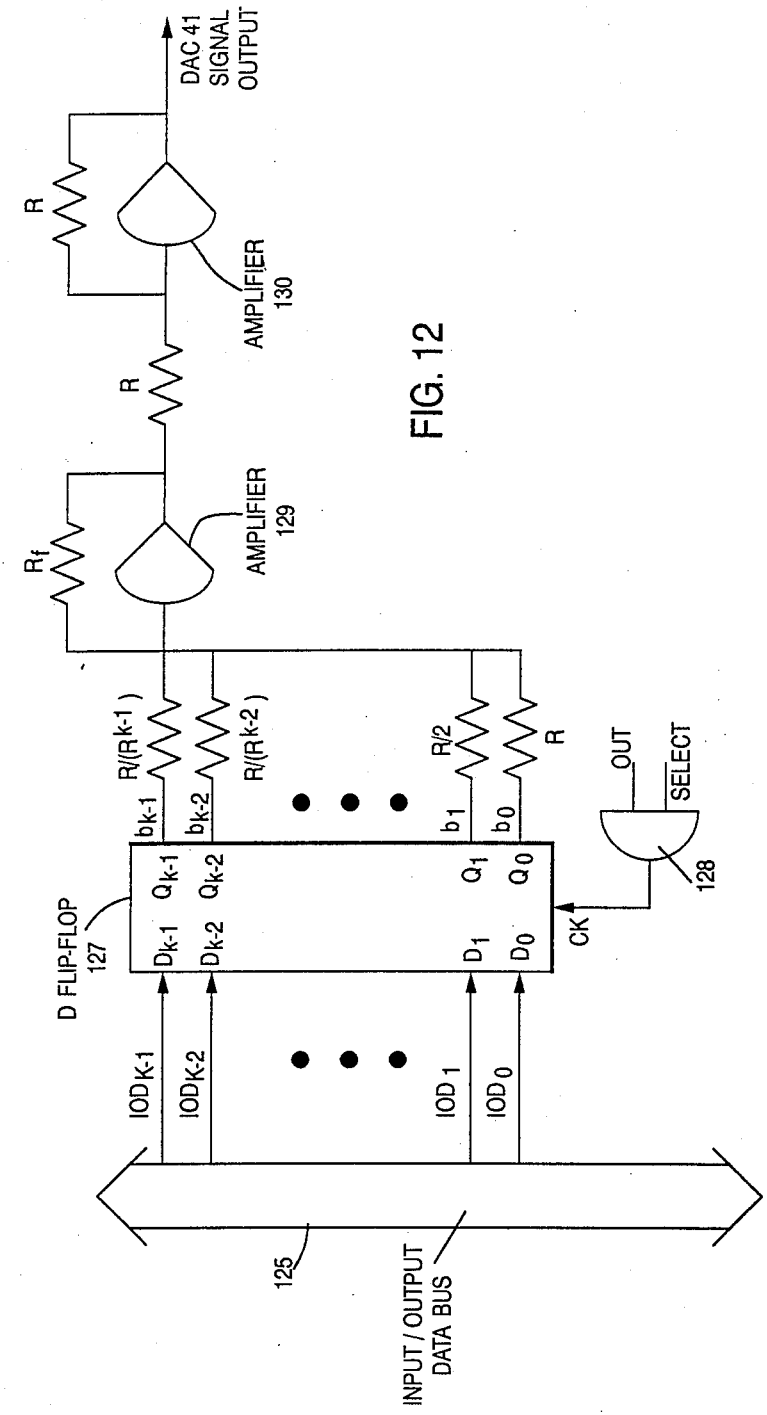
FIG. 12 shows components of a digital to analog converter.
Figure 13:
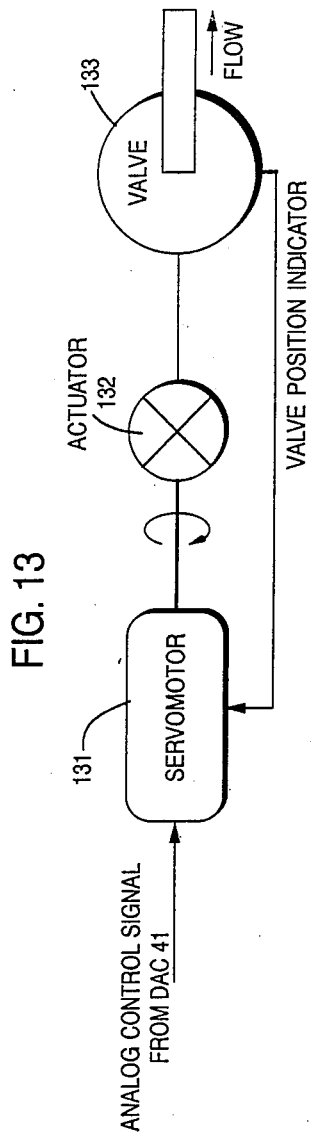
FIG. 13 shows components of the control effector.

CONTRAN 4 prepares the ADDC output for effecting a control command on the input of the process/plant 100. CONTRAN 4 comprises a digital to analog converter DAC 41, shown in FIG. 12, and a control effector, CF 42 which translates the analog signal from the DAC 41 into units appropriate for control function implementation, such as changing the position of a valve to adjust the flow rate of a fluid. The CF 42 may comprise a servomotor or an electromagnetic actuator dependent on the design of the process/plant and the input to the process. FIG. 13 shows the design components of the CF 42 in case of flow rate control of a boiler.

Figure 14:
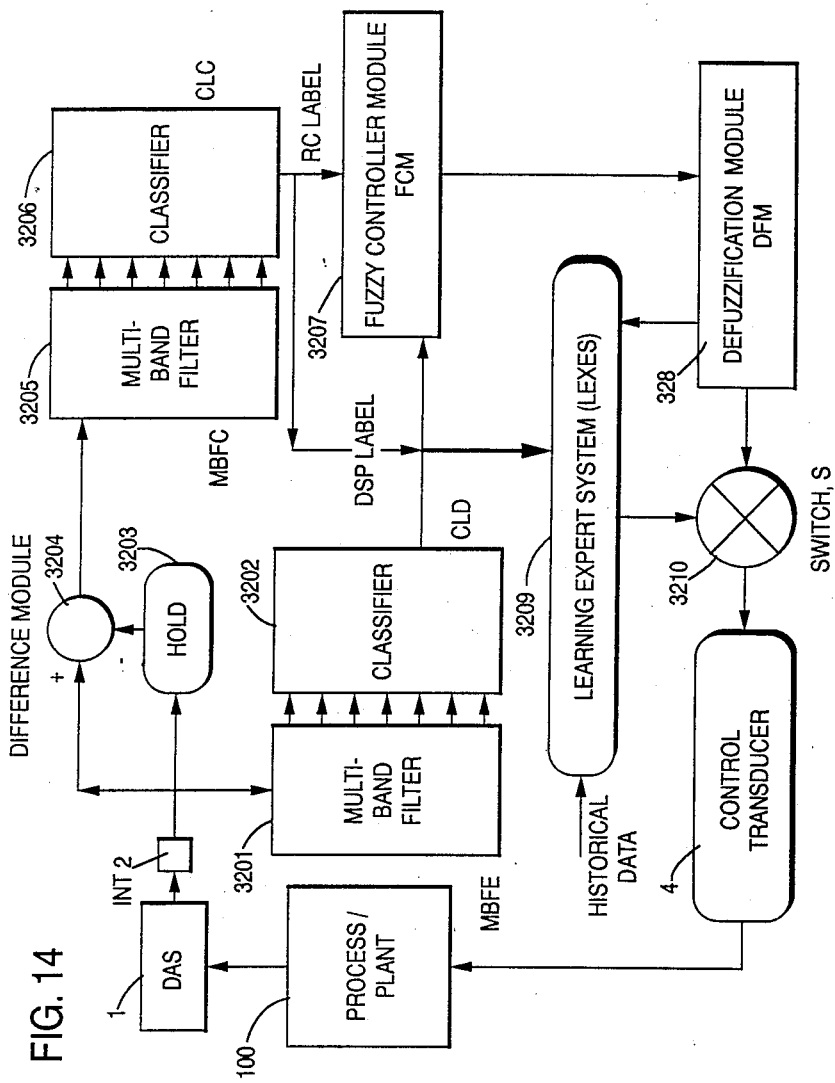
FIG. 14 shows components of the fuzzy expert controller.
Figure 15:
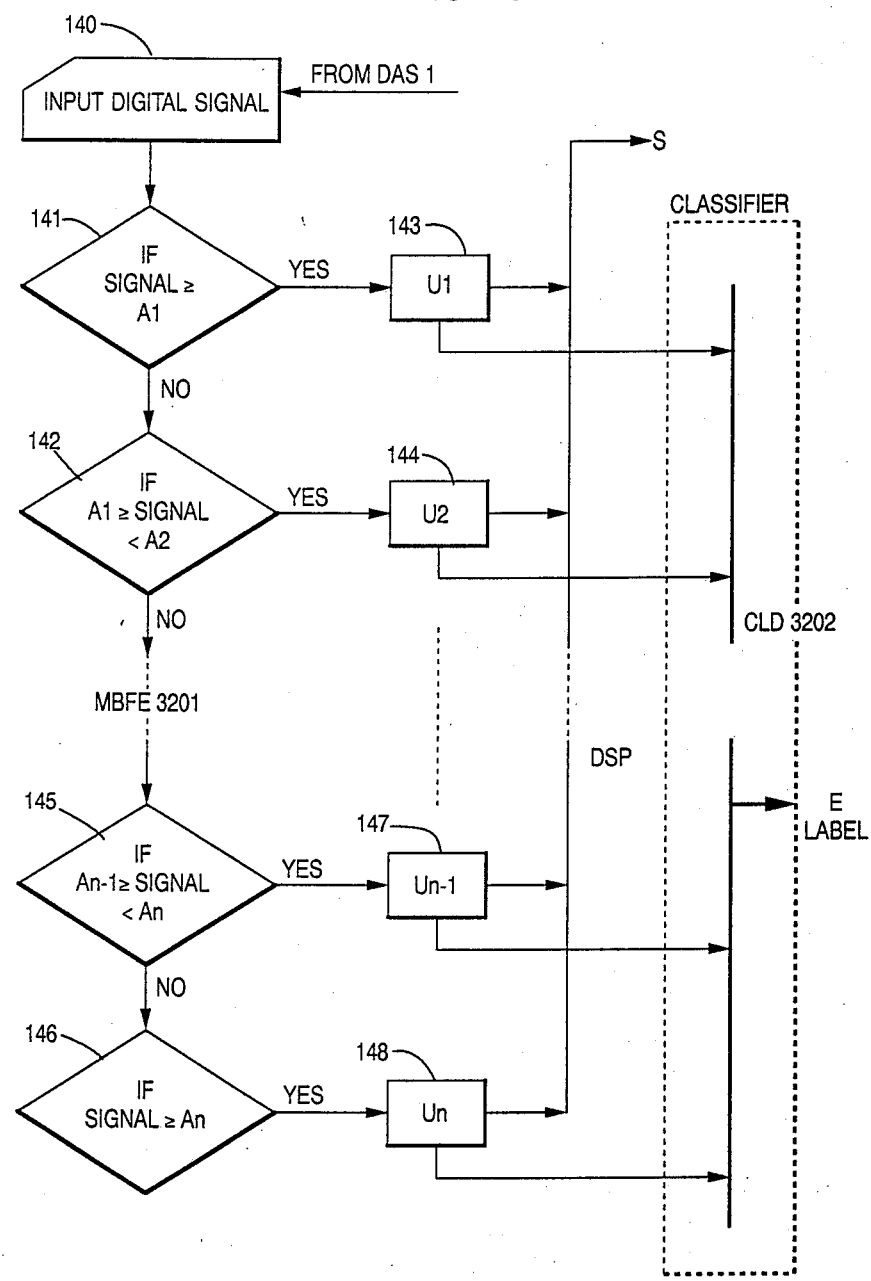
FIG. 15 shows components of the filter and classifier.

In parallel with the ADDC is a redundant and diversified fuzzy expert controller FEC 32 as seen in FIG. 14. The process/plant output signal processed by the DAS 1 is received by FEC 32 through INT 2. The digital signal is directed to a multiband pass filter MBFE 3201 that defines the range of deviation of the output signal from the set point of the output (DSP). The plausible deviation range is divided into segments representing positive and negative deviation (about 16 ranges may be selected). Each band is labeled by a number corresponding to the selected DSP range. The labeling process is achieved by the classifier CLD 3202. The computer implementation logic of the MBFE 3201 and the CLD 3202 is shown in FIG. 15.

Figure 16:
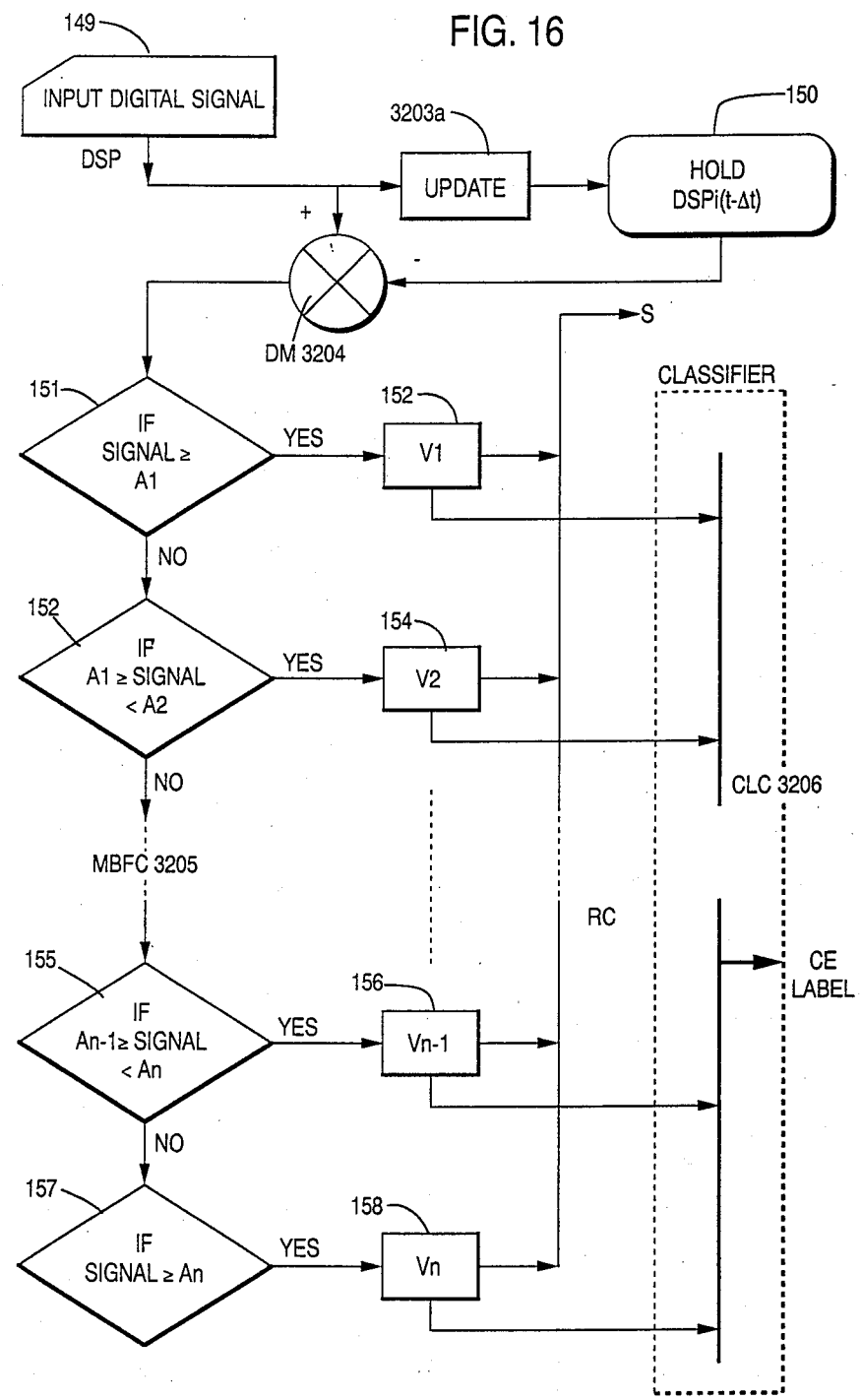
FIG. 16 shows components of the HOLD 3203, the difference module, DM 3204, the filter MBFC 3205, and the classifier CLC 3206.

The rate of deviation from the set point (RC) is computed by holding a prior signal in HOLD 3203 and subtracting the newly received signal by means of a difference module DM 3204. The computer RC is filtered by MBFC 3205 and classified by CLC 3206; as seen in FIG. 16.

Figure 17:
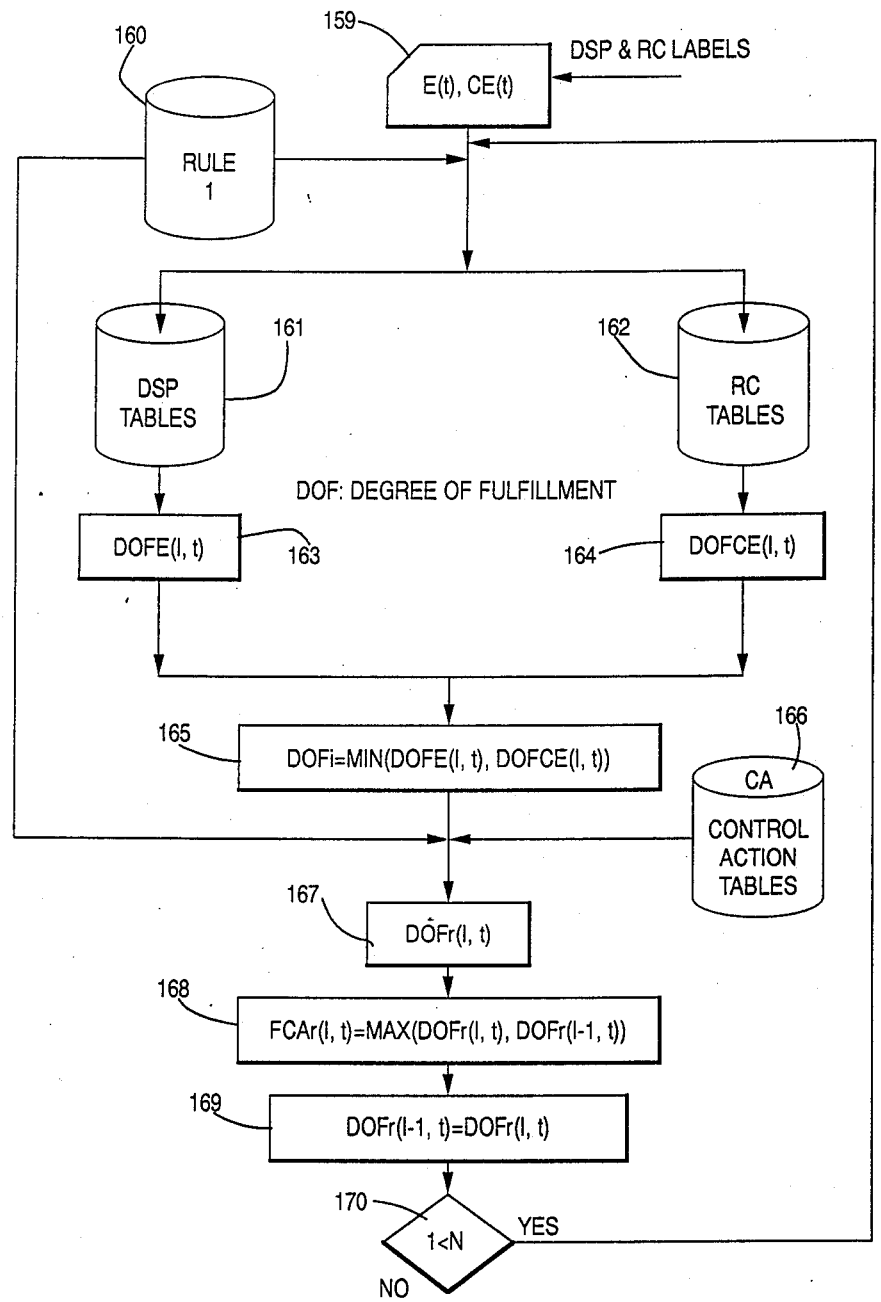
FIG. 17 shows logic for the fuzzy control module.

Both the DSP label and the RC label are fed to the fuzzy controller module FCM 3207 as seen in FIG. 17. In the FCM 3207 a set of tables representing the fuzzy sets of the DSP, RC, and control actions (CA) are stored. A list of control rules are available. By going through the rules a degree of fulfillment (DF) of each rule is computed. The resultant control action is then based on the maximum DF.

Figure 18:
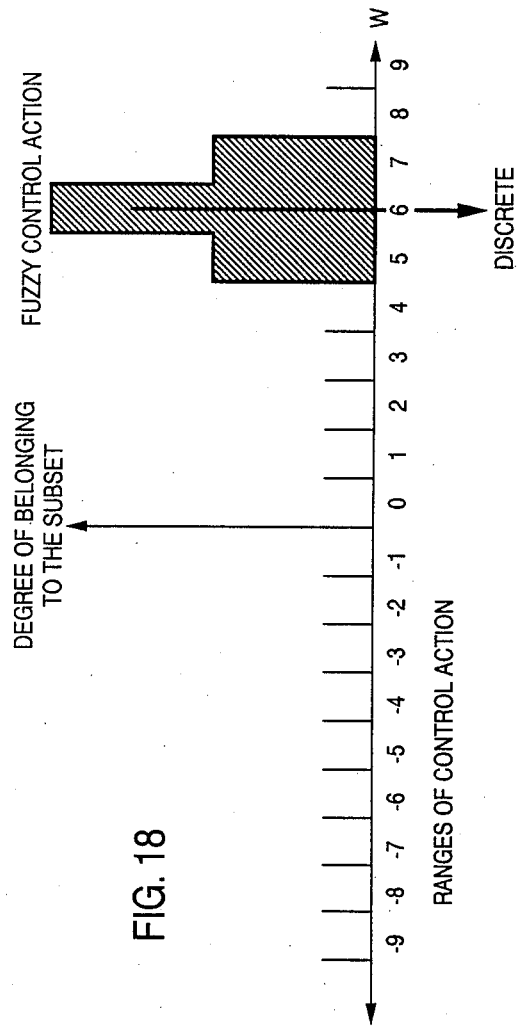
FIG. 18 shows defuzzification of control action.
Figure 19:
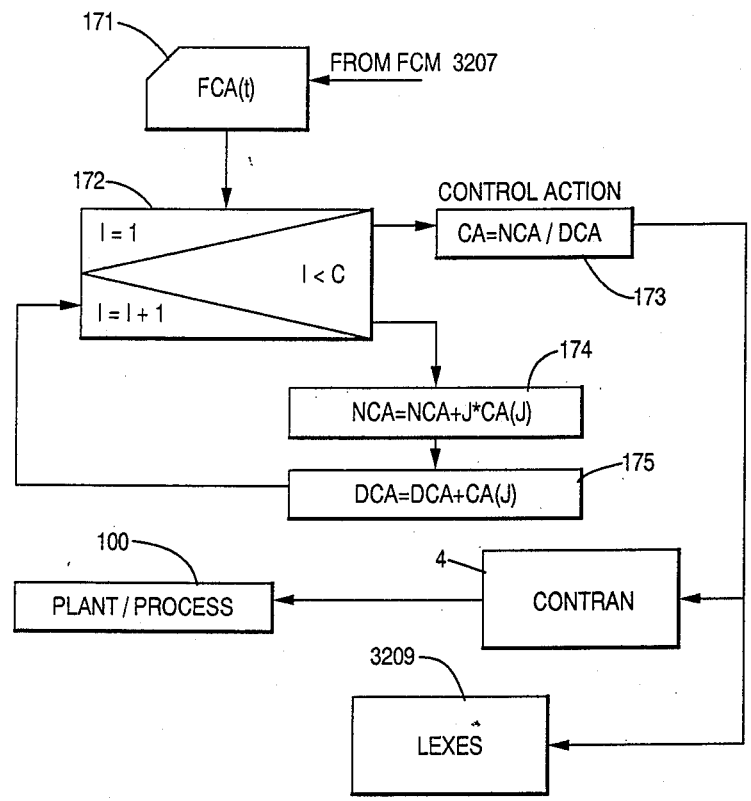
FIG. 19 shows logic for the defuzzification module.

Once a fuzzy control action is selected, the results are defuzzified through the defuzzication module DFM 3208 to give a discrete command. This is done by the center of gravity of the control action set as seen in FIG. 18. FIG. 19 shows the logic of computation of DFM 3208.

Figure 20:
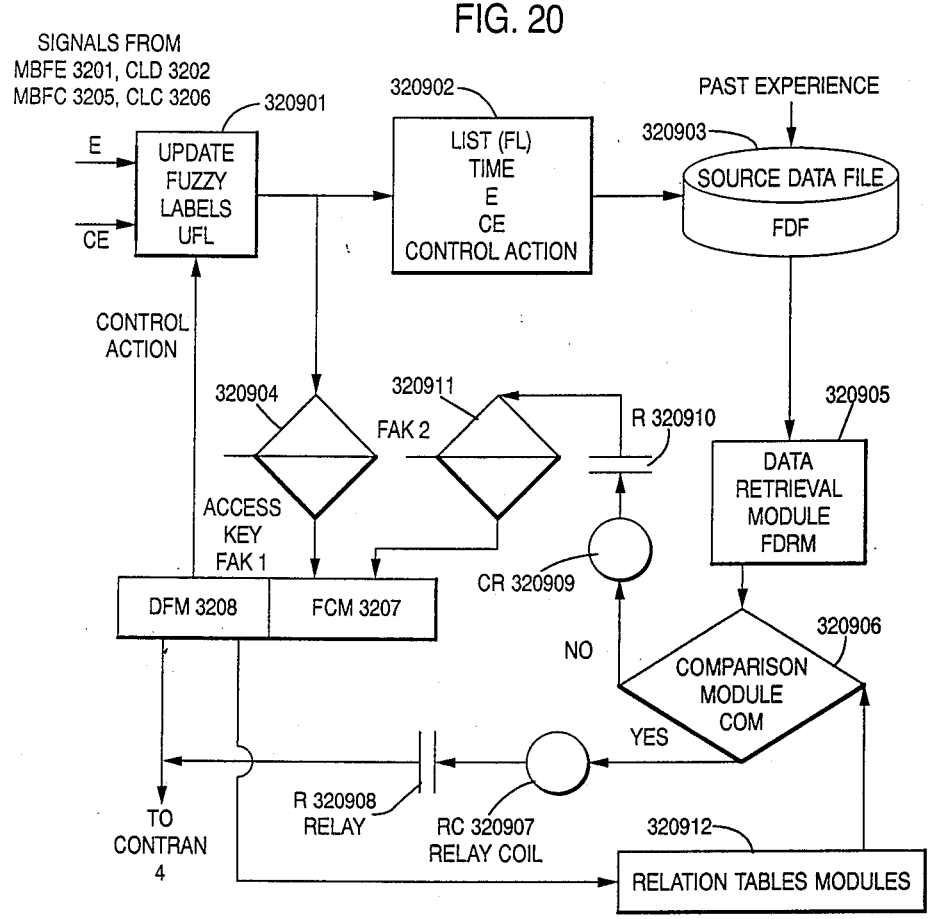
FIG. 20 shows modules of the learning expert system.

Also, the filtered and classified DSP and RC labels are channeled directly to a learning expert system LEXES 3209 which stores all historical control actions. In case of identification of a prior control action the FCM 3207 and the DM 3208 are by-passed and the action is sent through activation of a switch S 3210 to the CONTRAN 4 to effect the proper control at the input of the process/plant 100. The LEXES is shown in FIG. 20. The LEXES 3209 is based on the same principles as the LES 311; however, the successful control actions are compiled into a relation table module RTM 320912 which ban be used to determine the action directly for repeated situations.

Figure 21:
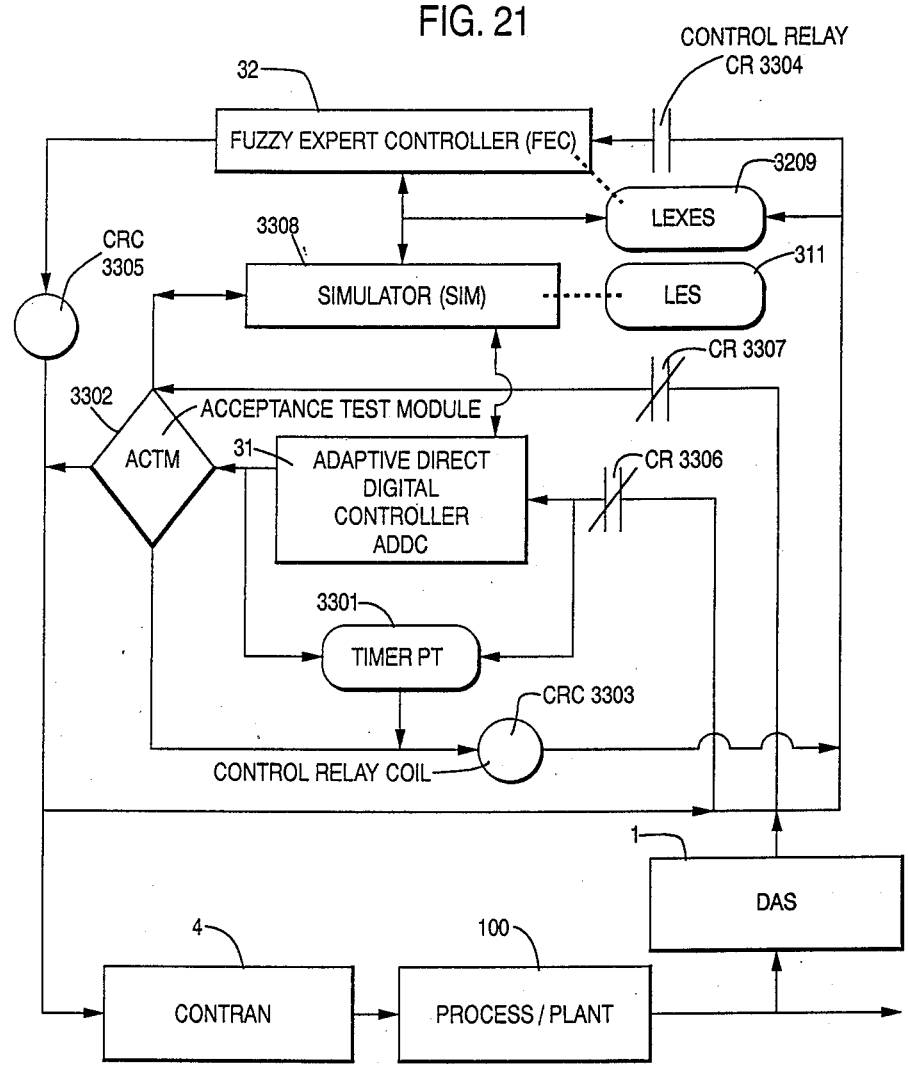
FIG. 21 shows modules of the interface.

The time of execution of the control action by the ADDC 31 is monitored by a preset timer PT 3301. The output of the ADDC 31 is also verified by the interface INF 33 as seen in FIG. 21 against an acceptance criteria evaluation module ACEM 3302. Should the execution time be less or more than the timer 3301 preset values or the ACEM 3302 indicated a fault, the control relay coil CRC 3303 is energized transferring the control function to the FEC 32 via the control relay CR 3304. As the FEC 32 outputs the control action the CRC 3305 is energized and the control command is directed to CONTRAN 4. The energization of CRC 3305 results in connecting CR 3306 and CR 3307 returning the control function to ADDC 31.

The preset timer PT 3301 is designed on the basis of eliminating the possibility of truncation errors, error accumulation and the like. It also contains a clock to count the number of transfers from the primary controller ADDC 31 to FEC 32.

Figure 22:
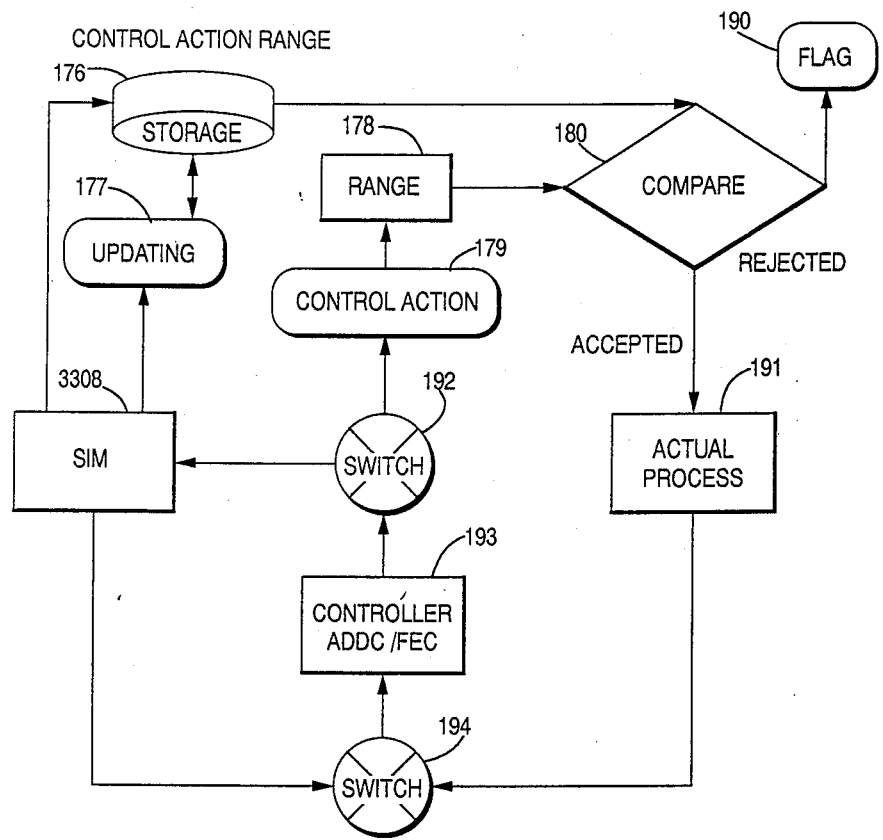
FIG. 22 shows control range check logic.
Figure 23:
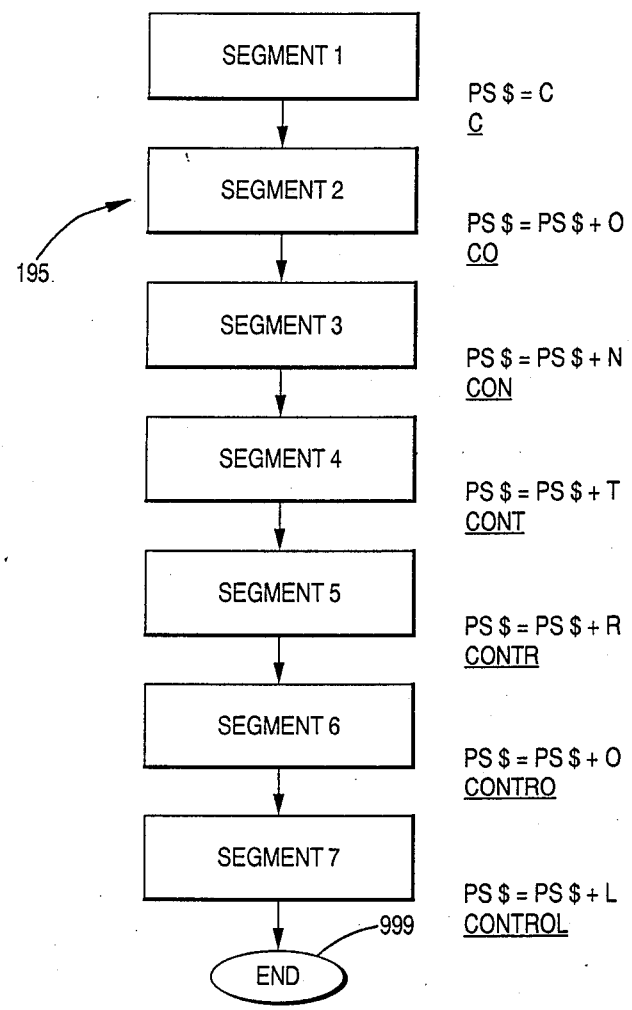
FIG. 23 shows a logic sequence with code words.

The ACTM 3302 comprise a simple fuzzy controller with a minimal set of rules to examine the control action range. The control action checking module FCACM 330201 is shown in FIG. 22. The ACTM 3302 also checks the completion of all ADDC segments by the use of a password; FIG. 23.

The INF 33 also contains a simulator, SIM 3308 which is a full scope simulation model of the plant/process 100. The controllers ADDC 31 and FEC 32 are engaged to SIM 3308 during absence of command for self diagnosis and to provide a knowledge base for the learning expert systems LES 311 and LEXES 3209.

The REFFTAC has wide application for all processes in which fault tolerant controllers are in demand. As an example, it can be used for control of equipment deployed unattended in space power systems, in land based power stations, and in processes in which interruption of operation can lead to loss of production.

While a preferred embodiment has been shown and described, it will be understood that the present invention is not limited thereto, but may be otherwise embodied within the scope of the present invention.

What is claimed is:

1. A hybrid control system for a process comprising:
   a first controller responsive to at least an output signal from the process to determine the instantaneous state of the process and provide an adaptive control of the process via a feedback control signal applied thereto;
   a second controller responsive to said process output signal for determining (a) deviations of the output signal from a predetermined value and (b) rates of deviation of the output signal from the predetermined value and utilizing (a) and (b) to provide a fuzzy logic control signal for the process;
   said second controller being a backup controller for said first controller in response to error or failure of the first controller.

2. A hybrid control system as claimed in claim 1, wherein said first controller is an adaptive direct digital controller usable as a primary expert controller.

3. A hybrid control system as claimed in claim 1, wherein said backup controller is a "fuzzy logic" expert controller usable as an independent controller.

4. A hybrid control system as claimed in claim 1, further comprising an interface system or transferring a control function between said first controller and said second controller.

5. A hybrid control system as claimed in claim 4, wherein said interface system includes a simulator means for performing diagnosis on at least said first controller.

6. A hybrid control system as claimed in claim 5, wherein said interface system performs diagnosis on said second controller.

7. A hybrid control system as claimed in claim 5, further comprising at least one learning expert means for storing correct control actions for direct application.

8. A hybrid control system as claimed in claim 7, wherein said learning expert means provides a reference for said interface system.

9. A hybrid control system for a process, comprising:
   a primary control means responsive to at least an output signal from the process to determine the instantaneous state of the process and provide an adaptive control of the process via a feedback control signal applied thereto;
   a backup control means responsive to said process output signal for determining (a) deviations of the output signal from a predetermined value and (b) rates of deviation of the output signal from the predetermined value and utilizing (a) and (b) to provide a fuzzy logic control signal for the process;
   a control signal transducer means for transducing said feedback control signal and said fuzzy logic control signal for actuating controlled devices;
   said primary control means including an adaptive direct digital controller;
   said backup control means including a "fuzzy logic" expert controller; and
   a learning means for receiving historical data relating to control actions taken with respect to the controlled devices; and
   an interface means for selecting between said primary control means and said backup control means.

* * * * *